Aug. 2, 1966

K. F. MAYERS 3,264,015

GLASS-TO-METAL SEAL

Filed March 31, 1961

INVENTOR.
KARL F. MAYERS
BY
Gillette, Virgil & Eslinger
ATTORNEYS

United States Patent Office 3,264,015
Patented August 2, 1966

3,264,015
GLASS-TO-METAL SEAL
Karl F. Mayers, Somerville, N.J., assignor to Philips Electronics and Pharmaceutical Industries Corp., New York, N.Y., a corporation of Maryland
Filed Mar. 31, 1961, Ser. No. 99,886
6 Claims. (Cl. 285—189)

This invention relates to glass-to-metal seals and particularly to glass-to-metal seals having at least one hollow metal member extending through and held within the glass.

In the manufacture of certain electrical components, such as condensers, it is common to enclose them within some sort of an hermetic container, usually of tubular form and provided with a glass-to-metal seal to make electrical connection between components within the container and components outside of it. In the case of condensers, for example, the body of the condenser is commonly provided with a lead wire at each end thereof, and this lead wire extends through a hollow metal member, or tube, which is hermetically sealed within a glass member which, in turn, is hermetically sealed within an outer metal ring. The lead wire is hermetically sealed within the tube, usually by being soldered thereto as a last step in completing the hermetic enclosure.

Heretofore it has been common to rely solely upon the solder to hold the wire in place and to seal it to the metal tube, but in using such condensers the section of the wire outside of the metal tube is normally soldered to other components. This reheats the soldered joint between the wire and the tube and may open it, thereby permitting air to enter the container and even freeing the condenser to move around inside, which may be worse in that it may result in disconnecting the condenser from the wire inside the container. Where reliability is essential, the tube may be crimped against the wire to make a firm mechanical joint. However, it has been found that doing so frequently tears the tube from the glass, again allowing air to enter the container, and sometimes even fracturing the glass member.

The seal of the present invention comprises an inner metal tube with a bulge in it close to one face of the glass, and preferably with the glass overlapping the bulge, but not more than about half of the axial length of the bulge. The bulge provides a limiting point to absorb the strain of crimping the outer end of the metal tube and to prevent this strain from reaching that portion of the tube that is in contact with the glass. This configuration of the metal tube is useful with seals made of any type of glass and metal, but it is especially useful in compression seals which do not rely upon a dissolved oxide layer on the surface of the metal tube to bond the same to the glass. The bulge limits the meniscus of the glass on the tube wall to a fixed maximum, thereby resulting in greater uniformity of seals. Furthermore, the bulge increases the torsional strength of the tube, which is especially desirable in high-reliability products.

The invention will be further described in connection with the drawing in which.

Figure 1:
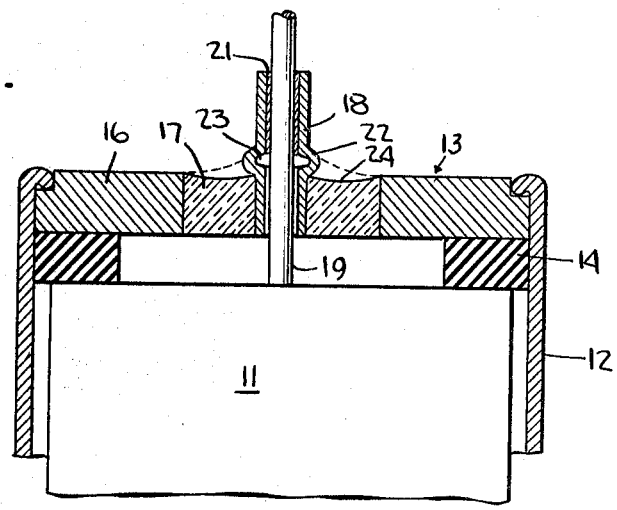
FIG. 1 is a fragmentary cross-sectional view of an electrical component having a seal constructed according to the invention.

The electrical component in FIG. 1 is indicated by reference character 11 and may be a condenser or any other electrical device. It is supported within an hermetic container comprising a cylindrical member 12 and an end seal 13. Customarily, two such end seals are provided, but since they are identical, only one is shown in the drawing. A spacer 14 may also be provided to fix the location of the component 11 within the container.

The end seal 13 comprises an outer metal ring, or member, 16, a glass member 17 held within it and hermetically sealed to it, and a hollow inner metal member, or tube, 18. The tube 18 is held by the glass member 17 and is hermetically sealed thereto, and it forms a tunnel through the glass through which a lead-in wire 19 extends. The wire 19 is attached to the component 11 and serves as a terminal for it. It is customary to fill up the space surrounding the wire 19 and within the tube 18 with molten solder 21 which solidifies in place.

In accordance with the present invention, the tube 18 is formed so as to have a bulge 22 in a limited area intermediate the ends of the tube 18. This bulge must be formed in such a way as to leave an annular open area 23; that is, the bulge 22 should not be flattened out so as to bring the upper and lower cylindrical sections of the hollow metal member 18 together. In fact, it is desirable that the axial length of the annular space 23 be at least approximately equal to the wall thickness of the tube 18.

Further, in accordance with the invention, the bulge 22 must be located adjacent to the outer face 24 of the glass member and must not be spaced appreciably from that face. This permits the bulge to serve as a fulcrum in the event that the outer end of the tube 18 is bent, and it also permits the bulge to serve as a strain-limiting device when the outer end of the tube 18 is crimped inwardly against the wire 19. While the bulge is adjacent to the face 24 of the glass member 17, this does not mean that the entire bulge must be outside of the face; the glass may overlap part of the bulge, up to approximately one-half of the axial length thereof, as indicated by the dotted lines 24a. Such overlap is preferable as it increases the friction and moment arm between glass 17 and tube 18, thereby increasing the torsional strength of tube 18.

Figure 2:
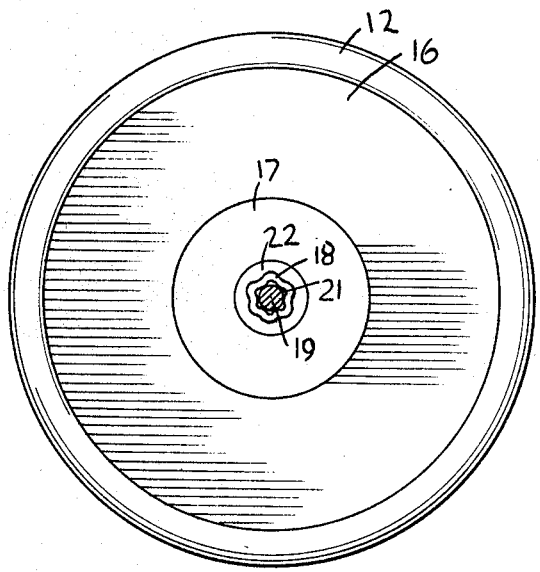
FIG. 2 is an end view of the electrical component of FIG. 1.

FIG. 2 is an end view of the device shown in FIG. 1. FIG. 2 shows one way that the outer end of the tube 18 may be crimped against the wire 19 to form a firm mechanical connection therewith. This has been found to be extremely important in the manufacture of highly reliable components since it holds the wire 19 in place even if the solder 21 is subsequently melted when the wire is externally soldered to other components of an electrical circuit.

Figure 3:
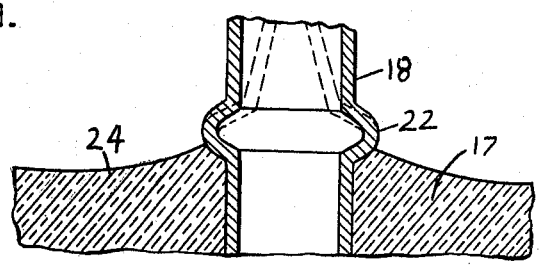
FIG. 3 is an enlarged view of a small part of the glass member and inner metal member of FIG. 1.

FIG. 3 shows an enlarged view of the tube 18 and the glass member 17 and illustrates the strain-limiting feature of the bulge 22. In FIG. 3, the face 24 of the glass comes less than half way up the axial length of the bulge 22, but it would not matter if the glass came exactly half way, for, as is indicated by the dotted lines, when the upper end of the hollow metal member 18 is crimped inwardly, the bending action starts at approximately the middle of the bulge 22 and the lower part of the bulge remains in place. It is clear from the drawing why there should be a separation between the upper end of the lower cylindrical part of tube 18 below the bulge 22 and the lower end of the upper cylindrical part; otherwise the bending or crimping action would apply force directly to the lower cylindrical part and would tend to pull it away from the glass member 17, just as if the bulge were not there. This can be best understood from a description of the method of making these seals.

Seal 13 is designated a three element seal because it is composed of three members 16–18, although there may be more than one inner member similar to tube 18. Most three element seals are made in one of two ways at the present time. One way results in a type of seal known as a strain-free seal because of the fact that the coefficients of thermal expansion of the outer metal ring 16 and the inner member 18 are closely matched to that of the glass member 17, and these three elements are held together by an oxide layer on the metal members 16 and 18, which dissolves in the molten glass during formation of the glass member 17 which is described and claimed in my copending application, Serial No. 651,065, now Patent 3,035,372.

The other way of making a three element seal results in a type known as a compression seal. In compression seals the coefficient of thermal expansion of the glass member 17 is considerably less than that of the outer metal ring 16. Commonly, the coefficient of thermal expansion of the glass is around $90\text{--}95 \times 10^{-7}$ units per unit length per °C. and the outer metal ring 16 is usually cold-rolled steel with a coefficient of thermal expansion of about $125\text{--}140 \times 10^{-7}$ units per unit length per °C. In any event, the coefficient of thermal expansion of the glass member 17 is usually no more than about four-fifths of the coefficient of thermal expansion of the metal ring 16. The tube 18 of a compression seal is usually made of an alloy consisting predominantly of nickel and iron in about equal amounts, which has a coefficient of thermal expansion that may be lower than that of the glass member 17 or perhaps a little higher, but not substantially higher. There may be an oxide layer on the metal parts but it does not provide the same bonding function as the oxide layer in strain-free seals.

In both strain-free seals and compression seals the glass member 17 is actually formed in place by heating the elements of the seal to a high enough temperature to melt the glass and reduce its viscosity sufficiently to allow it to flow of its own weight. In the case of compression seals this temperature is usually above about 1700° F. and is commonly about 1800° F. The glass and metal members of both types of seals are constrained in jigs so that the glass flows only radially to fill the entire space between the tube 18 and the outer ring 16, and then the whole unit is cooled to harden the glass and to produce an hermetic seal. The cooling step is especially important in compression seals. These seals are commonly cooled by transporting them on a continuously moving conveyor directly from an area heated to a temperature of about 1800° F. to an immediately adjacent area, which is cooled by a water jacket to such a low temperature that the water in the jacket is kept below the boiling point.

The oxide bond between the metal and glass in strain-free seals helps to prevent the tube 18 from pulling away from the glass member 17, at least to some extent, when the tube is bent or crimped. In compression seals, on the other hand, such oxide as may be present in the space between the glass and the metal members adds little, if any, strength to the seal. The hermetic quality of compression seals is mainly dependent upon the forces produced in the glass and metal members by the differences in contraction due to differences in coefficients of expansion and due also to the rate of cooling the seal. The bulge 22 in the tube 18 of compression seals is therefore especially helpful in limiting crimping and bending strains so that they do not affect that part of the tube 18 which touches the glass member 17 and is weakly bonded thereto. On the other hand, while the oxide layer between the glass member 17 and the tube 18 of a strain-free seal keeps these members from being torn apart quite as easily by bending or crimping, it causes stresses to be set up in the glass itself of such seals, and these stresses may cause the glass to fracture. Therefore, the bulge 22 is useful in both types of seals.

Although this invention has been described in terms of a specific embodiment, it will be understood by those skilled in the art that modifications may be made therein within the scope of the following claims.

What is claimed is:

1. A glass-to-metal hermetic seal comprising: an outer metal ring; a glass member within said ring, the periphery of said glass member bearing against the inner surface of said ring and being held thereby and fused thereto; and a hollow, metal, inner member open at both ends extending through and held by said glass member and fused thereto to provide a channel therethrough, said inner member having an outward circumferential bulge in a limited area adjacent to one surface of said glass member with the glass extending less than approximately half way over said bulge in the axial direction thereof, said bulge having a U-shaped cross-section with the sides of said U at an angle to each other.

2. A compression glass-to-metal hermetic seal comprising: an outer metal ring; a glass member having a coefficient of thermal expansion less than the coefficient of thermal expansion of said outer metal ring; and a hollow, metal, inner member open at both ends extending through said glass member to provide a tunnel therethrough, said inner member having a coefficient of thermal expansion not substantially greater than that of said glass member, said glass member being formed in place by being cooled from a temperature at which the glass flows of its own weight, whereby said inner member and said outer ring are fused to said glass member to form hermetic seals with contiguous portions of said glass member, and the surfaces of said outer ring and said inner member abutting said glass are substantially free of oxide on said outer ring and inner member, said inner member having an outward circumferential bulge in a limited area adjacent to one face of said glass member with the glass extending less than approximately half way over said bulge in the axial direction thereof, said bulge having a U-shaped cross-section with the sides of said U at an angle to each other.

3. A compression glass-to-metal hermetic seal comprising: an outer metal ring; a glass member having a coefficient of thermal expansion less than about four-fifths of the coefficient of expansion of said outer metal ring; and a hollow, metal tube open at both ends extending through said glass member to provide a tunnel therethrough, said metal tube having a coefficient of thermal expansion not substantially greater than that of said glass member, said glass member being formed in place by being cooled from a temperature at which the glass flows of its own weight, whereby said metal tube and said outer ring are fused to said glass member to form hermetic seals with contiguous portions of said glass member and the surfaces of said outer ring and said metal tube abutting said glass are substantially free of oxide from said metal tube and outer ring, said metal tube having an outward circumferential bulge in a limited area adjacent to one face of said glass member with the glass extending less than approximately half way over said bulge in the axial direction thereof, said bulge defining an annular space having an axial length at least substantially equal to the wall thickness of said tube, said bulge having a U-shaped cross-section with the sides of said U at an angle to each other.

4. A compression glass-to-metal hermetic seal comprising: an outer metal ring of steel; a glass member having a coefficient of thermal expansion less than about four-fifths of the coefficient of expansion of said outer metal ring; and a hollow, metal, inner member open at both ends extending through said glass member to provide a tunnel therethrough, said inner member being made of an alloy containing predominantly nickel and iron, said glass member being formed in place by being cooled from a temperature at which the glass flows of its own weight, said temperature being over approximately 1700° F., whereby said inner member and said outer ring are fused to said glass member to form hermetic seals with contiguous portions of said glass member and the surfaces of said outer ring and said inner member abutting said glass are substantially free of oxide said inner member and said outer ring, said inner member having an outward circumferential bulge in a limited area adjacent to one face of said glass member with the glass extending less than approximately half way over said bulge in the axial direction thereof, said bulge having a U-shaped cross-section with the sides of said U at an angle to each other.

5. A compression glass-to-metal hermetic seal comprising: a rigid outer metal ring of steel; a glass member having a coefficient of thermal expansion less than about four-fifths of the coefficient of expansion of said outer metal ring; and a hollow, metal, inner member open at both ends extending through said glass member to provide a tunnel therethrough, said inner member being made of an alloy containing predominantly nickel and iron, said glass member being formed in place by being cooled from a temperature at which the glass flows of its own weight, said temperature being over approximately 1700° F., whereby said inner member and said outer ring surfaces are substantially free of metal oxide and are fused to said glass member to form hermetic seals with contiguous portions of said glass member, said inner member having an outward circumferential bulge in a limited area adjacent to one face of said glass member with the glass extending approximately half way over said bulge in the axial direction thereof, said bulge defining an annular space having an axial length at least equal to the wall thickness of said tube, said bulge having a U-shaped cross-section with the sides of said U at an angle to each other.

6. A strain-free glass-to-metal hermetic seal comprising: an outer metal ring, the inner surface of said ring being oxidized to form a first oxide layer; a glass member within said ring, the periphery of said glass member bearing against the inner surface of said oxide layer and being molecularly bonded by said oxide layer to said metal ring; a hollow, metal, inner member extending through said glass member to provide a tunnel therethrough, the outer surface of said inner member being oxidized to form a second oxide layer bonded to said glass, said inner member having an outward circumferential bulge therein in a limited longitudinal area intermediate the ends thereof, said bulge having a generally U-shaped cross-section with the sides of said U at an angle to each other, said bulge being adjacent to one face of said glass member with said glass overlapping a portion of said bulge less than one-half of the axial length of said bulge.

References Cited by the Examiner
UNITED STATES PATENTS

| | | | |
|---|---|---|---|
| 2,263,396 | 11/1941 | Power | 174—50.6 |
| 2,603,915 | 7/1952 | Lysak. | |
| 2,815,474 | 12/1957 | Lewis et al. | |
| 3,035,372 | 5/1962 | Mayers | 161—196 |
| 3,107,757 | 10/1963 | Breadner | 65—43 |

FOREIGN PATENTS 1,227,260  8/1960  France.

OTHER REFERENCES

Partridge: "Glass-To-Metal Seals" (Sheffield, England), 1949 Pub. by The Society of Glass Technology (pp. 1–10, 13–26, 31 and 36–46).

Kohl: Material and Techniques for Electron Tubes (Rheinhold Pub. Co. N. Y., N. Y. 1960).

ALEXANDER WYMAN, *Primary Examiner.*

DONALL H. SYLVESTER, EARL M. BERGERT,
*Examiners.*

D. CRUPAIN, W. J. VANBALEN, *Assistant Examiners.*